Figure 1:
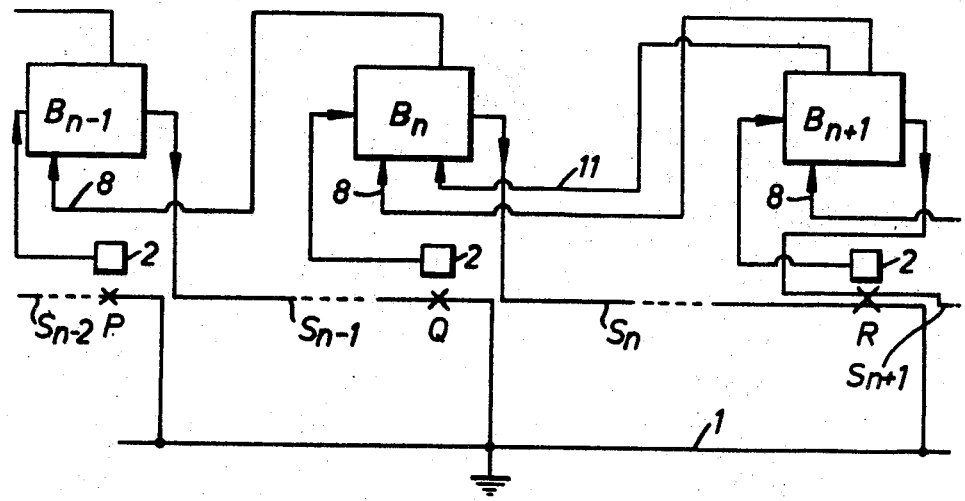

United States Patent

[11] 3,540,541

| [72] | Inventors | Frederick Walter Hartley<br>Hayes;<br>James Frederick Moore, Bedfont, England |
|---|---|---|
| [21] | Appl. No. | 776,058 |
| [22] | Filed | Nov. 15, 1968 |
| [45] | Patented | Nov. 17, 1970 |
| [73] | Assignee | Electric & Musical Industries Limited<br>Hayes, England<br>a British company |
| [32] | Priority | Nov. 16, 1967 |
| [33] | | Great Britain |
| [31] | | 52,137/67 |

[54] AUTOMATIC CONTROL SYSTEMS FOR VEHICLES
7 Claims, 6 Drawing Figs.

[52] U.S. Cl. .................................................. 180/98,
180/79.1, 246/29
[51] Int. Cl. .................................................. B62d 5/04
[50] Field of Search .......................................... 180/98,
79.1, 79; 246/29, 30

[56] References Cited
UNITED STATES PATENTS

| 2,847,080 | 8/1958 | Zworykin et al. | 180/79.1X |
| 3,039,554 | 6/1962 | Hosking et al. | 180/77 |
| 3,147,817 | 9/1964 | DeLiban | 180/79.1X |
| 3,245,493 | 4/1966 | Barrett | 180/98 |

Primary Examiner—Kenneth H. Betts
Attorney—William W. Downing, Jr.

ABSTRACT: An automatic control system is provided for driverless vehicles in which conductors are arranged in sections along a path. The conductive sections can be selectively energized by a steering signal for steering and a run signal to control movement along the path. Control means are provided for at least some of the sections to apply the steering signal to a section whilst inhibiting the run signal to that section in the presence of a steering signal in another section.

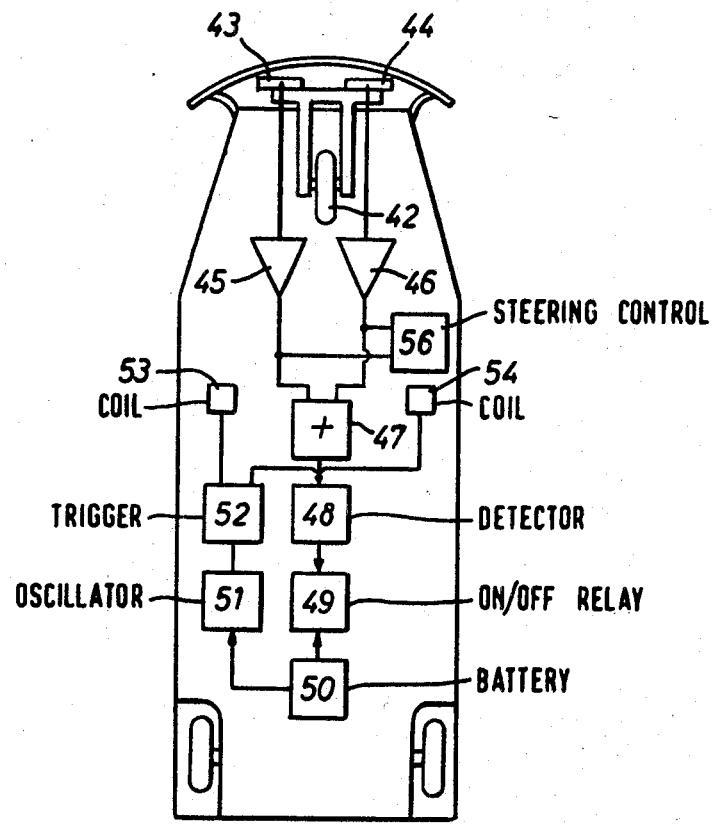

AUTOMATIC CONTROL SYSTEMS FOR VEHICLES

This invention relates to automatic control systems for vehicles and it relates especially although not exclusively to systems in which driverless tugs are automatically steered along a path, the steering being effected by means on the tug, including two sensing coils, responsive to the magnetic field set up by alternating current which flows in an electric current conductor laid along the path.

A system of the kind referred to in the preceding paragraph is described in U.S. Pat. No. 3,039,554. According to that specification, the conductor is laid on or just below the surface of the ground or floor and is divided into sections which define control blocks. At transitions from one block to another the two conductor sections overlap for a short distance and a control circuit, called a block unit, is provided. Each block unit is coupled to a stop coil which is energized when the section which ends at the transition is energized with the steering signal. There is also a pickup coil located so that it can couple inductively with a transmission coil on the under side of the tug, the transmission coil being fed with alternating current when the control circuit on the tug is operating. On the under side of the tug there is a second coil located so that it can couple inductively with the stop coil of the block unit. When a tug arrives at a transition the transmission coil signals the presence of the tug to the pickup coil which sets a memory relay in the block unit. This relay, when set, tends to operate switches which remove the steering signal from the conductor section which the tug is about to leave and apply the steering signal to the section which the tug is about to enter. However operation of the switches can be inhibited by inhibiting means as long as the section beginning at the next transition is energised with the steering signal. Moreover as long as the switch operation is delayed, the stop coil is energised and the response of the respective pickup coil on the tug stops the tug with the two sensing coils of the steering means above the overlap. Therefore the steering control is not interrupted and safety circuits, which operate to disable the tug when steering control is lost, are not operated. When the inhibiting means are eventually rendered inactive, and the aforesaid switches operate, the stop coil is deenergised and the tug can restart automatically.

The control system described is also effective for sections which converge to a junction or crossing point, provided the inhibiting means are made responsive to the presence of a steering signal in more than one other section. Therefore the system prevents collisions between different tugs operating on a layout. However, there must always be a "dead" section between any two occupied sections. In other words, a tug cannot enter a particular section until the preceding tug has left the second preceding section. This limits the number of vehicles which can be used on the layout, or it requires the provision of many more blocks than the number of tugs to be utilised. Consequently there is an increase in system and installation costs. In addition the provision of overlap at transitions leads to higher installation costs.

According to the present invention there is provided an automatic control system for vehicles including conductors arranged in sections along a path, means for selectively energising conductor sections by a steering signal which can be used to effect steering control of a vehicle on the path, means for selectively energising conductor sections by a run signal which can be used to control the movement of the vehicle along the path, and control means for at least some of the sections such that a vehicle can be stopped in a section without losing control of the steering thereof, said control means including means for applying the steering signal to that section, whilst inhibiting the run signal in response to the presence of a steering signal in another section.

In accordance with one form of the present invention the control system comprises a block unit for each of a number of transitions from one section to another, each said block unit comprising a first switch responsive to the arrival of a vehicle to apply the steering signal to the conductor section beginning at the transition a second switch responsive to the arrival of the vehicle to tend to apply the run signal to the same section, means for inhibiting operation of said second switch when the first switch of another similar block unit is in the operative condition, and means to restore both switches to the inoperative condition when the vehicle arrives at the next transition, the arrangement being such that when operation of said second switch is inhibited the vehicle can pass over to the steering control of the next section and be then brought to a stop.

As a result of the invention a vehicle can move on to the section next behind a section occupied by another vehicle before being stopped, thus permitting vehicles to queue in the stopped condition in adjacent sections.

For transitions to sections leading to junctions or crossing points, it may still be preferable to provide overlap of the conductor sections as described in the aforesaid specification. In this case, in accordance with the present invention the inhibiting means is preferably arranged, when active, to cause the vehicle to stop on the overlap without transferring the steering signal from the section which ends to the section which begins at the overlap, and when rendered inactive to allow both the steering signal and the run signal to be applied at the section at the beginning of the overlap. These features prevent two converging sections from inhibiting each other, since the steering signal is switched on simultaneously with the run signal and until then no signal is produced to render effective the inhibiting means at the beginning of the other of the converging sections. Similar considerations apply to two section which cross.

The arrival of a vehicle at a transition may be signalled by means of an oscillation applied to a coil on the vehicle. This oscillation, termed a block call signal, may be sensed by means of a pickup coil adjacent to each transition and used to operate a memory device which retains information of the vehicles presence at least until the run signal is applied to the respective section. Preferably however, the conductor of a section is itself used to pick up the block call signal and to apply it to the respective block unit, means being provided to interrupt the steering and run signals for short intervals to enable the block call signal from the vehicle to be detected by the conductor section.

Figure 2:
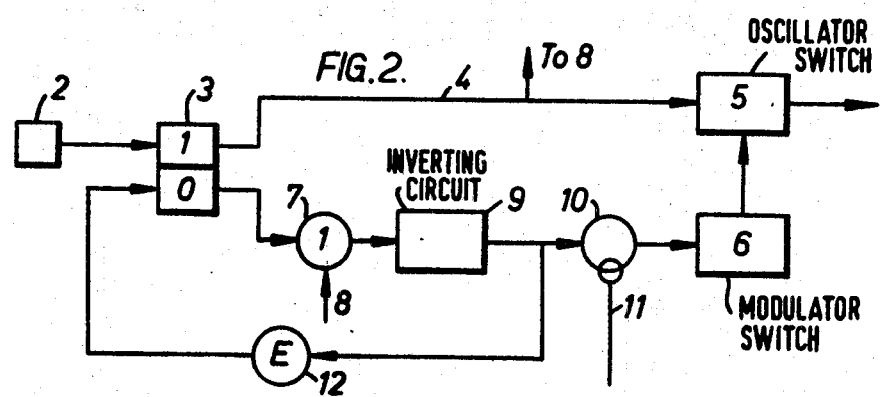
Figure 3:
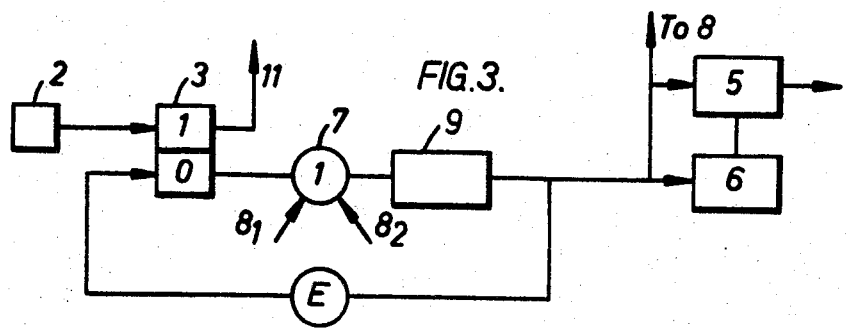
Figure 4:
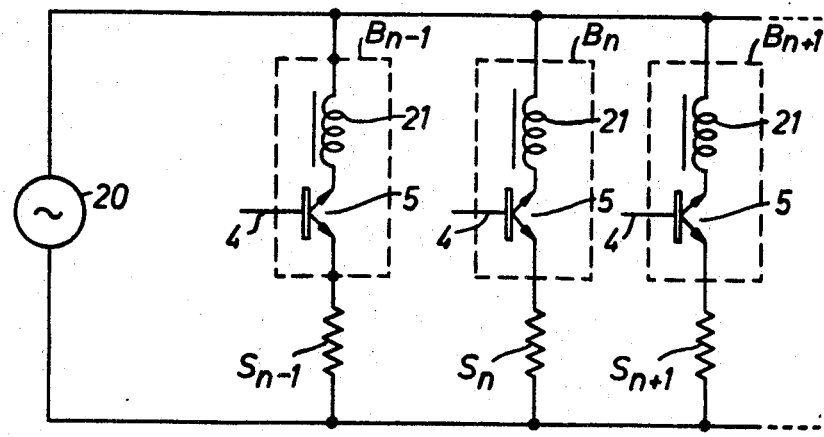
Figure 5:
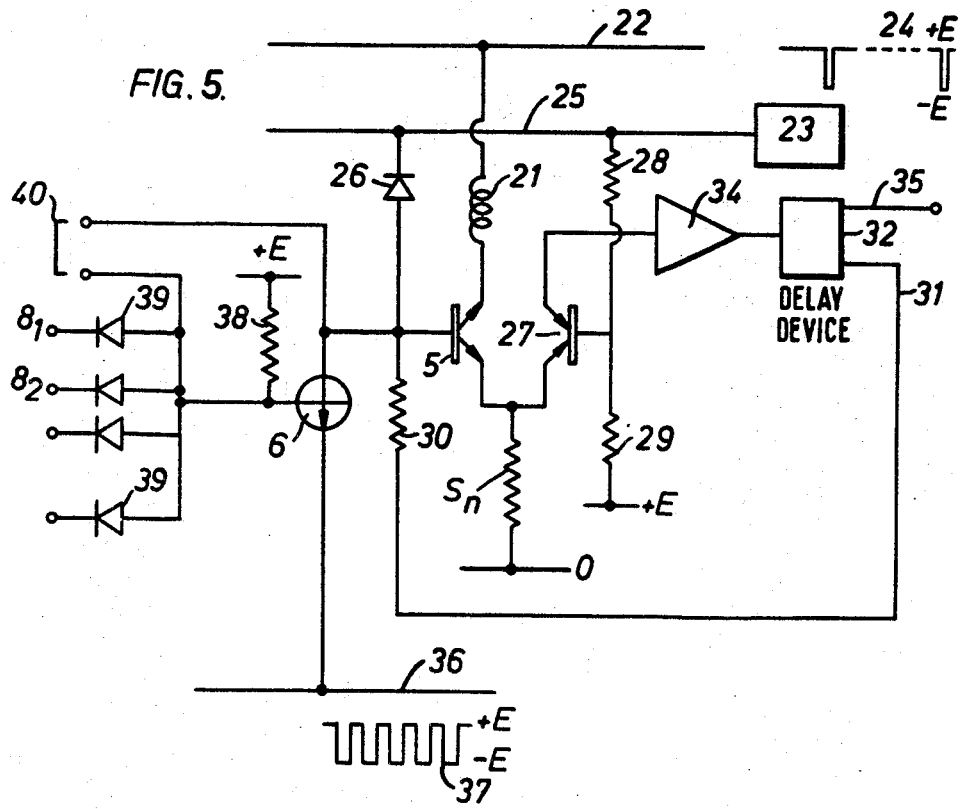

In order that the present invention may be clearly understood and readily carried into effect it will now be described with reference to the accompanying drawings in which:

FIG. 1 illustrates, diagrammatically and mainly in block form, part of a layout of an automatic control system for vehicles according to one example of the invention, FIG. 2 illustrates a construction of one form of block unit used in the layout illustrated in FIG. 1, FIG. 3 illustrates another form of block unit used in the layout illustrated in FIG. 1, FIG. 4 illustrates a preferred form of generator for generating the steering signal for the system, FIG. 5 illustrates an alternative form of block unit which may be used in a layout such as illustrated in FIG. 1, but in which the sections of the guide conductor are used to pick up block call signals, and FIG. 6 illustrates diagrammatically one form of tug suitable for systems such as illustrated in FIG. 1 to 5.

Referring to the drawings, the reference $S_n-_2$, $S_n-_1$, and $S_n+_1$ denote four sections of the guide conductor of an automatic control system for vehicles. The vehicles are tugs such as illustrated in FIG. 6, which are generally of the construction described in the aforesaid specification having however detailed modifications as will appear from the following description. The section $S_n+_1$ is one of two converging sections, the other of these two sections not being illustrated. Block units are provided for each transition from one section to another, the three block units shown in the drawing being denoted by references $B_n-_1$, $B_n$ and $B_n+_1$. These three block units differ in detail, as will be apparent subsequently, but they are representative of block units which can be used throughout the system as appropriate. Each guide conductor section is connected from its respective block unit to a common return lead 1. For example the section $S_n$ runs from the block unit $B_n$ to the return lead. The conductor $S_{n-2}$ stops just short of the conductor $S_{n-1}$ and similarly $S_{n-1}$ stops short of $S_n$, and there is no overlap. However since section $S_n+_1$ is one of two converging sections, the sections $S_n$ and $S_n+_1$ overlap for a short distance as illustrated.

FIG. 2 illustrates a construction which can be used for block units such as $B_{n-1}$ and $B_n$, although with slightly different connections. The unit shown in FIG. 2 comprises a block coil 2 which can also be seen in the case of the units $B_{n-1}$ and $B_n$ in FIG. 1. This coil is positioned at the side of the respective guide conductor section, so that in response to an oscillation of say 5KHz transmitted by a tug, the so called block call signal, it produces voltage to a bistable circuit 3 which constitutes a memory. When this circuit is set in the 1 state it produces a signal in a conductor 4 capable of operating a switch 5 to allow an oscillation to be supplied to the guide conductor section beginning at the transition corresponding to the block unit. This oscillation may have a frequency of 2KHz and constitutes the steering signal. The switch 5 is associated with a second switch 6 which when operated causes the steering signal to be modulated in amplitude, the amplitude modulation constituting the run signal. For example the run signal may produce say 20 percent amplitude modulation of the steering signal at a frequency of 50Hz.

The signal from the bistable circuit 3 which operates the switch 5 also functions as an inhibit signal for one or more other block units in the system. Such an inhibit signal, from another block unit and fed to the unit which is illustrated in FIG. 2, is applied to a buffer gate 7 by the lead 8. This buffer gate also receives an output signal when the bistable circuit 3 is in the O state. The gate 7 will therefore produce an output signal either when there is an inhibit signal from another block unit or when the circuit 3 is in the O state or when both these signals are present. The output of the gate 7 is however "inverted" by an inverting circuit 9 so that there is an output signal from the inverting circuit 9 when there is no output from the gate 7 and vice versa. The output from the inverting circuit 9 is applied via an inhibiting gate 10 to the modulator switch 6, the switch being operative only when such a signal is applied. The gate 10 has a lead 11 for an inhibiting signal which may in certain circumstances be applied from another block unit. The output signal from the inverting unit 9 is also applied to an "end" circuit 12 which produces, at the end of any output signal from the inverting circuit 9, a signal which will restore the trigger circuit 3 to the O state. When the unit illustrated in FIG. 2 is used as the unit $B_{n-1}$ of the FIG. 1 arrangement, the inhibiting signal from the lead 4 is applied to the preceding block unit $B_{n-2}$ and the signal on the lead 8 is the inhibiting signal from the lead 4 of the block unit $B_{n-1}$. Moreover there is no inhibiting input to the gate 10.

The construction of the block unit $B_n+_1$ is illustrated in FIG. 3, and it differs from that illustrated in FIG. 2 in that when the trigger circuit 3 is in the 1 state it produces no more than a "memory-out" signal on the lead 11 to act as the inhibiting signal for the gate 10 of the block unit $B_n$. The buffer gates 7 has two leads $8_1$, and $8_2$ for inhibiting signals, one from the section which converges with the section $S_n+_1$ and the other from the next following section. An output signal from an inverting circuit 9 in the case of the FIG. 3 block unit not only operates the modulator switch 6 but also operates the oscillator switch 5 so that the steering signal and the run signal are switched simultaneously to the section $S_n+_1$. The output signal from the inverting circuit 9 is also applied as an inhibiting signal to lead 8 of the block unit $B_n$ and similarly to other block units as required.

The tug illustrated in FIG. 6 has a steerable front wheel on a bogey 42 which carries two sensing coils 43 and 44 for sensing a 2KHz oscillation applied to the guide conductor. The output of the sensing coils 43 and 44 is applied via amplifiers 45 and 46 to a steering control circuit 56 which steers the truck so as to tend to maintain the output of the two sensing coils equal to one another. The output of the sensing coils 43 and 44 is also added together in a circuit 47 and then applied to a detector 48 which produces an output only when the steering oscillation is modulated at 50Hz by the run signal. The output of the detector is used to operate an on/off relay 49 which controls the supply of power from the battery 50 to the driving motor for the tug. The battery 50 also powers an oscillator 51 which generates an oscillation of 5KHz frequency which is applied selectively, by a trigger 52, to one or other of two coils 53 and 54 which are positioned to couple with block coils such as 2, positioned on one side or other of the guide conductor. The trigger 52 is controlled by a programme device carried by the tug, which can be set to determine which branch the tug will follow at junction points. Other details of the tug may be similar to those of the tug described in the aforesaid specification.

The operation of the system described with reference to FIGS. 1, 2 and 3 is such that when a tug reaches a point P near the end of section $S_{n-2}$ it calls for the steering and run signals to be applied to the conductor sections $S_{n-1}$. This call is effected by the block call signal from the oscillator 51, which is picked up by the block coil 2 and applied to the trigger circuit 3 in the block unit $B_{n-1}$. The steering signal is immediately applied to section $S_{n-1}$, regardless of any inhibition of the run signal by reason of a signal on the lead 8 to the buffer gate 7. The application of the steering signal to the section $S_{n-1}$ applies an inhibiting signal to the preceding unit and switches off both the steering and run signals from the section $S_{n-2}$. It is however arranged that there is sufficient delay in the switching off to ensure that the tug will continue to travel until its steering coils 43 and 44 are within the control range of the steering signal applied to the section $S_{n-1}$. The steering control is therefore maintained, even although an inhibiting signal is applied to the buffer gate 7. If there is such a signal, the run signal is not applied to section $S_{n-1}$ and the tug stops a few feet inside the section $S_{n-1}$. This arrangement allows tugs to queue in adjacent sections and there is no need to provide for a dead section between adjacent tugs. As soon as any tug in the section $S_n$ leaves that section, the inhibiting signal is removed from the gate 7 in block unit $B_{n-1}$. An output is then produced by the inverting circuit 9 to switch on the modulation and apply a run signal to the section $S_{n-1}$. When the tug reaches the point Q at the end of the section $S_{n-1}$, the application of the run signal to the section $S_n$ reapplies an inhibiting signal via the lead 8 to the gate 7 in $B_{n-1}$ and produces an output from this gate which removes the output from the inverting circuit 9. The modulator switch is switched off and the output of circuit 12 restores the bistable circuit 3 to the O state. This in turn switches off the steering signal via switch 5 and removes any run inhibiting signal to the preceding block unit.

When the tug arrives at the point R near the end of the section $S_n$, it comes under the control of the block unit illustrated in FIG. 3. In this case the block call signal picked up by the block coil 2 does no more than produce a "memory-out" signal on the lead 11 which inhibits the gate 10 of the unit $B_n$. This disables the modulator switch 6 of the unit $B_n$ and so removes the run signal from the section $S_n$ without removing the steering signal so that the tug will tend to stop on the overlap between the sections $S_n$ and $S_n+_1$. However when the bistable circuit 3 in $B_n+_1$ changes to the 1 state the output signal of the buffer gate 7 will disappear unless an inhibiting signal is applied to the gate 7 by one or both of the leads $8_1$ and $8_2$. Assuming that there is no such inhibiting signal, the inverting circuit 9 produces an output signal which in this case operates both switches 5 and 6 and applies both the steering signal and the run signal to section $S_n+_1$ so that the tug is able to proceed along that section. The output signal from the inverter 9 is applied also as an inhibiting signal to the lead 8 of the unit $B_n$, removing, by the action previously described, the steering signal from the section $S_n$. If however there is an inhibiting signal on one or both of the leads $8_1$ and $8_2$ the tug will stop on the overlap and the inhibiting signal will not be removed from the lead 8 of $B_n$. The construction of the block unit $B_n+_1$ prevents the section $S_n+_1$ and the other section which converges with it from inhibiting each other permanently, if two tugs are waiting at the same time at the beginning of the two converging sections.

In a practical layout, saving in cost and complexity can be achieved if a common oscillation generator is used to generate the steering signal for a number of block units, arranged within a single block cabinet. In a large layout a cabinet may incorporate up to 50 block units. FIG. 4 illustrates a suitable construction for the circuit for generating and feeding the steering signal selectively to conductor sections. In FIG. 4 a master oscillation generator is represented by the symbol 20, and sections of the guide conductor such as $S_n-_1$, $S_n$ and $S_n+_1$ are represented as resistors, the resistance of a section being say 30 ohms. The block units $B_n-_1$, $B_n$ and $B_n+_1$ are represented by dotted rectangles; only the switches 5 are shown in these block units and each of these switches is in the form of a symmetrical transistor which is rendered conductive by the signal on the conductor 4 as previously described. Each transistor switch is connected in series with an inductor 21 such that when anyone of the switches 5 is closed a substantially constant current is supplied to the respective guide conductor section. Instead of using inductors 21 as series reactors, capacitors may be used to ensure constant current drive to the conductor sections.

In the system illustrated with reference to FIG. 1, the presence of a tug on any one section is denoted by the state of the bistable circuit 3, this circuit being set initially to record the presence of a tug by the voltage induced in the block coil 2 when the tug appears at the beginning of the respective section. In a modified form of system provision is made to search effectively continuously for the presence of a tug in a particular block, this being achieved by arranging that the guide conductor section is used to pick up the block call signal. FIG. 5 depicts the block unit for a system modified in this way. In this FIG. reference 22 denotes the bus bar to which is applied the output of the master oscillator 20 of FIG. 4 and references 5 and 21 denote the transistor switch and the series inductor of the respective block unit, say $B_n$. The conductor section $S_n$ is again denoted as a resistor. The reference 23 denotes a multivibrator which generates a rectangular pulse waveform a fraction of which is represented at 24. This pulse waveform alternates between +E and −E volts. Each pulse duration is about 2mS and the repetition period is about 100 mS. The multi-vibrator is common to all the block units in a single cabinet and the pulse waveform is applied as a gating waveform by a bus bar 25 to the base electrode of the transistor 5 via a diode 26, and to the base electrode of a complementary transistor 27 via a resistor 28. The base electrode of the transistor 27 is returned to a reference potential of +E by a resistor 29. On the other hand the base electrode of 5 is connected by resistor 30 to one output lead 31 of a delay device 32, such as a monostable circuit. As shown, the emitter collector path of the transistor 27 is connected from the guide conductor section $S_n$ to an amplifier 34, the output of which forms the input to the aforesaid delay device 32. The delay device 32 has a second output lead 35 which provides the inhibit signal for the gate 7 of one or more other block units. The output on the lead 35 is of the opposite polarity from that on the lead 31 which is applied to the base of the transistor 5.

The switch 6 in the block unit shown in FIG. 5 is in the form of a silicon switching transistor, the collector-emitter path of which is connected from the base of the transistor 5 to a bus bar 36 to which is applied a run signal 37. The run signal is a square waveform having a period of one-fiftieth second and which alternates between voltage levels of +E and −E. The base electrode of the transistor 6 is connected by resistor 38 to the positive potential line and is also connected to the anodes of diodes 39, the cathode of which are connected to the leads $8_1$, $8_2$ ...for inhibiting signals. The switch bar 40 is provided which can connect the base electrode of the transistor 5 directly to the anodes of diodes 39. When the circuit illustrated in FIG. 5 is operating, the pulses of the waveform 24 switch on the transistor 27 at intervals of approximately 100mS and switch off the transistor 5 if the latter is conducting. The transistor 27 remains conducting, each time, for about 2mS and if there is a tug on the section $S_n$, the block call signal from the tug picked up by the guide conductor is applied via the transistor 27 to the detecting amplifier 34. The block call signal when present though only detected intermittently maintains the delay circuit 32 in a condition in which an output voltage +E is applied via the lead 31 to the base of transistor 5. At the same time the voltage −E appears on the output lead 35. The delay circuit 32 in effect fills in the gaps between the pulses of the waveform 24 and provides a continuous block call signal for the base of the transistor 5. This signal is sufficient to maintain the transistor 5 conducting (assuming the transistor 6 is switched off) in the gaps between the pulses of the waveform 24. Therefore the steering signal is applied from the bus bar 22 to the guide conductor section $S_n$. When this is so, and when there is no inhibiting signal on any of the leads $8_1$, $8_2$ the run signal 37 switches the transistor 6 intermittently on and this in turn switches the transistor 5 intermittently off, producing in this case 100 percent modulation of the steering signal and thus applying the run signal to the guide conductor. The gate pulse waveform 24 must of course be such that the gaps which it produces in the steering signal will not be interpreted by the tug as a run signal. When there is an inhibiting signal on any of the leads $8_1$, $8_2$... the transistor 6 is held off, so that no modulation of the steering signal can be produced.

The switch bar 40 is closed when it is intended to use the circuit of FIG. 5 as a block unit, such as $B_n+_1$, before a convergence point. In this case an inhibit signal on any of the leads 8 will hold the transistor 5 nonconducting and so prevent both the steering signal and the run signal from being applied to the conductor section. The tug in such a case will stop on the overlap, as previously described.

The gaps produced in the run and steering control signals by the waveform 24 are not sufficient to interfere with the operation of the tug since they represent only a "blind" distance of a fraction of an inch.

The examples of the invention which have been described may be modified in a number of ways. For example optical signalling means may be used instead of signalling by magnetic induction to record the presence of vehicles in different sections. Moreover the steering and run signals may be applied to side by side conductors in the sections, instead of being superimposed in the same conductor.

We claim:

1. An automatic control system for vehicles including conductors arranged in sections along a path, means for selectively energising conductor sections by a steering signal which can be used to effect steering control of a vehicle on the path, means for selectively energising conductor sections by a run signal which can be used to control the movement of the vehicle along the path, and control means for at least some of the sections such that a vehicle can be stopped in a section without losing control of the steering thereof, said control means including means for applying the steering signal to that section, whilst inhibiting the run signal in response to the presence of a steering signal in another section.

2. A guidance system according to claim 1 in which the control means includes a block unit for each of a number of transitions from one section to another, each said block unit comprising a first switch responsive to the arrival of a vehicle to apply the steering signal to the conductor section beginning at the transition, a second switch responsive to the arrival of the vehicle to tend to apply the run signal to the same section, means for inhibiting operation of said second switch when the first switch of another block unit is in the operative condition, and means to restore both switches to the inoperative condition when the vehicle arrives at the next transition, the arrangement being such that when said second switch is inhibited the vehicle can pass over to the steering control at the next section and be then brought to a stop.

3. A guidance system according to claim 2 in which the conductor sections do not overlap at said transitions.

4. A guidance system according to claim 2 in which at some other transitions from one section to another the conductor sections overlap and said control means includes another kind of block unit at each of said other transitions, each such block unit comprising means to record the arrival of a vehicle at the transition and to remove the run signal from the conductor section ending at the transition, and switch means responsive to the arrival of the vehicle to tend to apply the steering signal and the run signal to the conductor section beginning at the transition, means for inhibiting operation of the switch means when the steering signal is applied to one or more other conductor sections and means to remove the steering signal from the section ending at the transition when the inhibiting means is or becomes inoperative.

5. A guidance system according to claim 4 in which said other transitions precede a junction point of two sections and said inhibiting means in each respective block unit is responsive to the presence of the steering signal either in the other section leading to the junction or in the section beginning at the junction.

6. A guidance system according to claim 1 in which a coil is provided adjacent each transition to detect the presence of a vehicle by magnetic induction.

7. A guidance system according to claim 1 in which means is provided in intermittently interrupting the application of signals to the conductor sections to sense signals induced in said sections by a vehicle.